(12) United States Patent
Hassenrik et al.

(10) Patent No.: US 7,022,022 B2
(45) Date of Patent: Apr. 4, 2006

(54) CONSTANT VELOCITY FIXED BALL JOINT IN THE FORM OF A COUNTER-TRACK JOINT

(75) Inventors: Ida Hassenrik, Troisdorf (DE); Stephan Maucher, Siegburg (DE); Thomas Weckerling, Lohmar (DE); Peter Harz, Hennef (DE); Wolfgang Hildebrandt, Siegburg (DE)

(73) Assignee: GKN Automotive GmbH, (DE)

( * ) Notice: Subject to any disclaimer, the term of this patent is extended or adjusted under 35 U.S.C. 154(b) by 207 days.

(21) Appl. No.: 10/433,717

(22) PCT Filed: Nov. 21, 2001

(86) PCT No.: PCT/EP01/13495

§ 371 (c)(1),
(2), (4) Date: Oct. 10, 2003

(87) PCT Pub. No.: WO02/46630

PCT Pub. Date: Jun. 13, 2002

(65) Prior Publication Data

US 2004/0072622 A1    Apr. 15, 2004

(30) Foreign Application Priority Data

Dec. 4, 2000    (DE) ................................ 100 60 119

(51) Int. Cl.
*F16D 3/224*    (2006.01)
(52) U.S. Cl. .................... 464/145; 29/434; 29/898.061
(58) Field of Classification Search ................ 464/144, 464/145, 906; 29/434, 898.061, 898.062, 29/898.064
See application file for complete search history.

(56) References Cited

U.S. PATENT DOCUMENTS

| | | | |
|---|---|---|---|
| 3,370,441 A * | 2/1968 | Aucktor | 464/144 |
| 3,633,382 A * | 1/1972 | Westercamp | 464/144 |
| 5,288,273 A | 2/1994 | Krude | |
| 5,599,234 A | 2/1997 | Harz et al. | |
| 5,616,081 A * | 4/1997 | Krude et al. | 464/145 |
| 6,709,338 B1 * | 3/2004 | Weckerling et al. | 464/145 |

FOREIGN PATENT DOCUMENTS

| | | |
|---|---|---|
| DE | 1 251 595 | 10/1967 |
| DE | 39 25 857 A1 | 2/1991 |
| DE | 40 31 819 C1 | 3/1992 |
| DE | 44 03 591 C1 | 4/1995 |
| DE | 196 53 311 C2 | 10/1998 |
| DE | 198 31 011 C1 | 3/2000 |
| GB | 847 569 | 9/1960 |
| JP | 07 98023 | 4/1995 |
| JP | 2000 240678 | 9/2000 |

* cited by examiner

*Primary Examiner*—Kenneth Thompson

(57) ABSTRACT

A counter track joint including first pairs of tracks whose control angles open in a first axial direction, and second pairs of tracks whose control angles open in a second axial direction. The outer joint part forms an introducing aperture for the ball cage. The ball cage, while engaging the outer tracks, can be threaded into the outer joint part in the second axial direction. The outer joint part forms a first stop and guiding face for a spherical outer face of the ball cage. Between the introducing aperture and the first stop and guiding face, the outer joint part comprises a displacement region for the ball cage. A securing element forms a second stop and guiding face for the spherical outer face of the ball cage.

23 Claims, 5 Drawing Sheets

CONSTANT VELOCITY FIXED BALL JOINT IN THE FORM OF A COUNTER-TRACK JOINT

The invention relates to a constant velocity fixed ball joint in the form of a counter track joint, comprising an outer joint part with outer tracks, an inner joint part with inner tracks, torque transmitting balls which are received in pairs of tracks consisting of outer tracks and inner tracks, and a ball cage with cage windows in which the balls are held in a common plane and are guided on to the angle-bisecting plane when the joint is articulated; first outer tracks, together with first inner tracks, form first pairs of tracks whose control angles open in a first axial direction $R_1$; second outer tracks, together with second inner tracks, form second pairs of tracks whose control angles open in a second axial direction $R_2$; wherein the control angles are defined as angles between the tangents at the ball contact points in the tracks when the joint is in the aligned condition. In this embodiment, the control angles are achieved by an axial offset of the centres of curvature of the outer tracks and inner tracks in the respective component relative to a central plane defined by the centres of the balls when the joint is in the aligned condition.

Constant velocity fixed ball joints in the form of counter track joints, as such, are known. With prior art joints of this type it is generally proposed that, for the purpose of providing support relative to the outer joint part and the inner joint part respectively, the outer face of the cage and/or of the inner face of the cage are/is designed so as to be approximately spherical. When mounting such joints, use is made of the prior art technology of over-articulating when mounting the balls, i.e. first the outer joint part, the ball cage and the inner joint part are inserted into one another without the balls, whereupon excessively large articulation angles not achievable in operation are set between the outer joint part and the inner joint part, with the balls being inserted into the cage windows from the outside in different articulation positions.

It is the object of the present invention to provide a joint of said type which, while having advantageous strength and ball guiding conditions, permits a simplified assembly method.

The objective is achieved in that the ball cage has a spherical outer face with a greatest diameter $D_1$; that the outer joint part forms an introducing aperture for the ball cage with an aperture diameter $D_2 < D_1$ measured between the outer tracks; that the ball cage, in engaging the outer tracks, can be threaded into the outer joint part in the second axial direction $R_2$; that the outer joint part forms a first stop and guiding face for the spherical outer face of the ball cage, which first stop and guiding face supports the ball cage in the outer joint part; that between the introducing aperture and the first stop and guiding face, the outer joint part comprises a displacement region for the ball cage with an internal diameter of $D_3 \geq D_1$; and that a securing element attached at the outer joint part in front of the introducing aperture forms a second stop and guiding face for the spherical outer face of the ball cage, which second stop and guiding face axially fixes the ball cage relative to the first stop and guiding face.

The above-described characteristics necessitate a conventional assembly of the ball cage and outer joint part by threading the webs between the cage windows of the ball cage into the outer tracks of the outer joint part, but subsequently permit the inner joint part to be axially mounted in the pre-assembled unit consisting of the outer joint part and ball cage with inserted balls wherein the outer joint part and said pre-assembled unit can be slid into one another in a coaxial position and wherein in one assembly position, the ball cage in the outer joint part is pulled in the direction of the introducing aperture, with the first balls in the first ball tracks being displaced outwardly by the maximum amount, whereupon the inner joint part is slid through the displaced balls into the outer joint part. Thereafter, the ball cage is moved away from the introducing aperture over the displacement region in the outer joint part. After the ball cage has abutted the first stop and guiding face in the outer joint part, the joint is secured by a securing element attached to the outer joint part. By making use of a recess at the open end of the outer joint part, which recess, as compared to the greatest outer diameter of the ball cage, produces a smaller introducing aperture, the wrapping region of the outer tracks for the balls at the introducing aperture and therebehind as far as the displacement region in the outer joint part can be increased. Insofar as reference is made here to the introducing aperture of the outer joint part with reference to the assembly operation of joints with a separately produced base and also in the case of disc joints, this can also be the aperture pointing to the base, and the securing element to be attached can be the joint base itself or an annular or cover element inserted between the outer joint part and the joint base.

In the case of this assembly operation, the balls, especially in cases where the ball cage is coaxially aligned relative to the outer joint part, the balls are inserted from the inside of the ball cage into the cage windows and into the outer tracks. It is also possible to proceed in such a way that the balls—with the ball cage being articulated relative to the outer joint part—are inserted individually from the outside into the cage windows and pivoted into the outer tracks.

In view of the above-mentioned assembly method it is possible, according to a preferred embodiment, that the inner joint part is produced so as to be integral with a joint journal or shaft shank, which increases the strength and reduces the number of parts.

According to a particularly advantageous embodiment it is proposed that the ball cage comprises an introducing aperture for the inner joint part through which the inner joint part can be introduced in the second axial direction $R_2$ in a coaxial position relative to the ball cage. In particular, it is possible for the inner face of the ball cage to be undercut-free when viewed in said second axial direction.

According to a preferred embodiment it is proposed that the ball cage, on its inside, forms a stop and guiding face for a spherical outer face of the inner joint part. However, such a contact between the inner joint part and the ball cage is not compulsory. Axial fixing of the inner joint part relative to the ball cage can also be effected in both axial directions indirectly via ball tracks, balls and cage windows.

As already mentioned in connection with the possible assembly method, the securing element can be an annular additional element attached at the joint aperture of the outer joint part or individual wedge elements formed on or attached thereto, with the second axial direction pointing from the joint aperture to the joint centre, whereas as an alternative thereto, the securing element can be the joint base produced separately from the outer joint part, or it could be an annular or cover-shaped additional element inserted between the outer joint part and the joint base, wherein said second axial direction points from the joint base to the joint centre.

Particular advantages of the inventive joint consist in that the cage, because of its contour which is undercut-free on the inside, is easy to produce from a production-technical point of view, for example by being formed by a punch.

Preferred embodiments of the invention as well as the assembly method will be explained below with reference to the drawings wherein FIG. 1 shows an inventive fixed counter track joint in a first embodiment with an outer joint part produced in one piece
 a) in a longitudinal section through a ball track plane
 b) in a longitudinal section through a plane between ball tracks
 in a finish-assembled condition.

FIG. 3 shows an inventive fixed counter track joint with an outer joint part produced in one piece according to FIG. 1
 a) in a longitudinal section through a plane between ball tracks as in FIG. 2b
 b) the enlarged detail X according to FIG. 3a.

FIG. 5 shows the inventive fixed counter track joint with a welded-on joint base according to FIG. 4
 a) in a longitudinal section through a plane between ball tracks as in FIG. 4b,
 b) the enlarged detail X according to FIG. 5a.

Below, the various sections and illustrations of the individual Figures will be described jointly.

Below, FIGS. 1 to 3 will be described jointly.

Figure 1A:
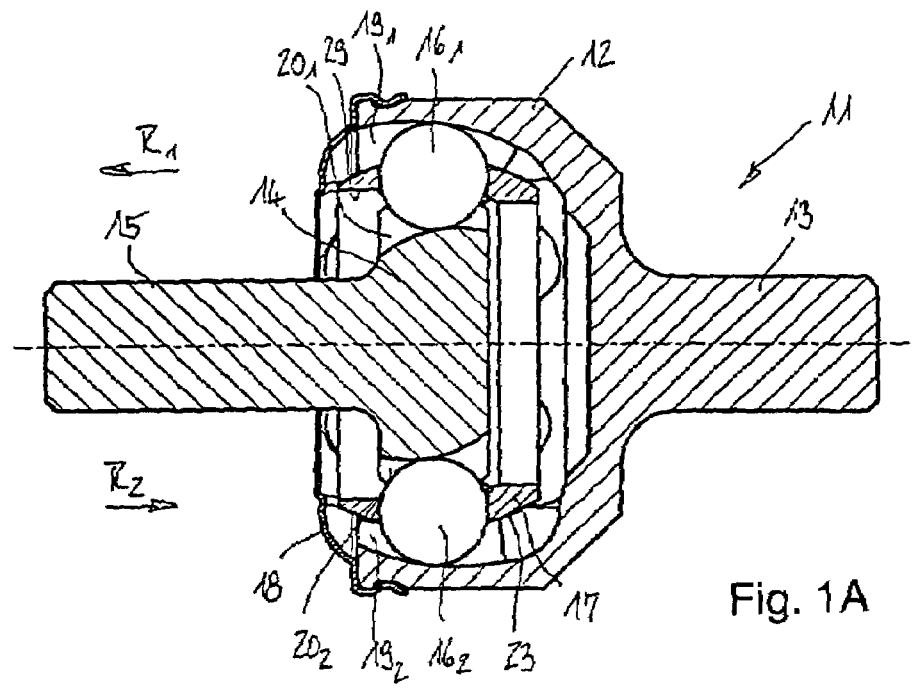
Figure 1B:
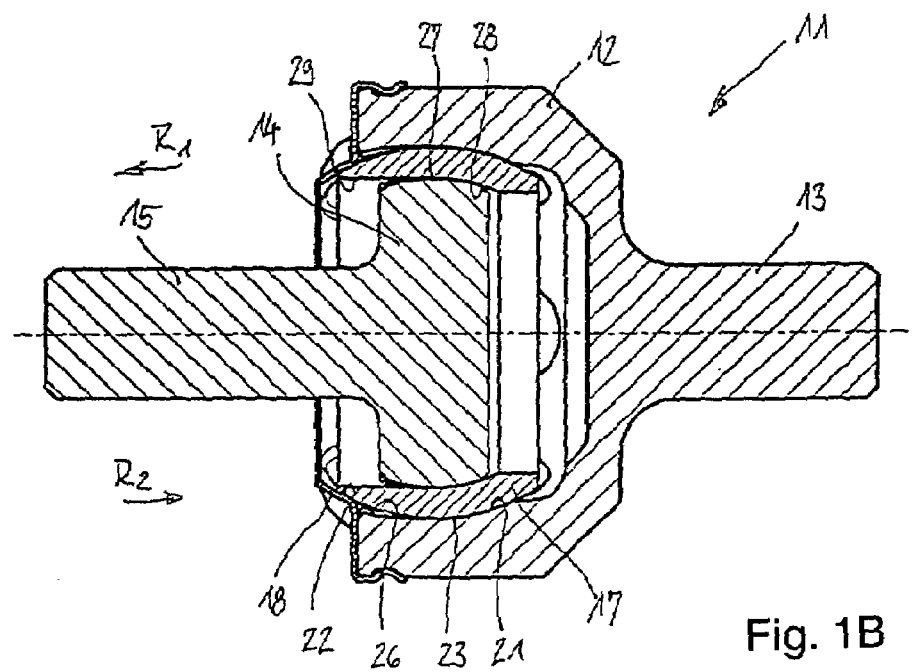
Figure 2A:
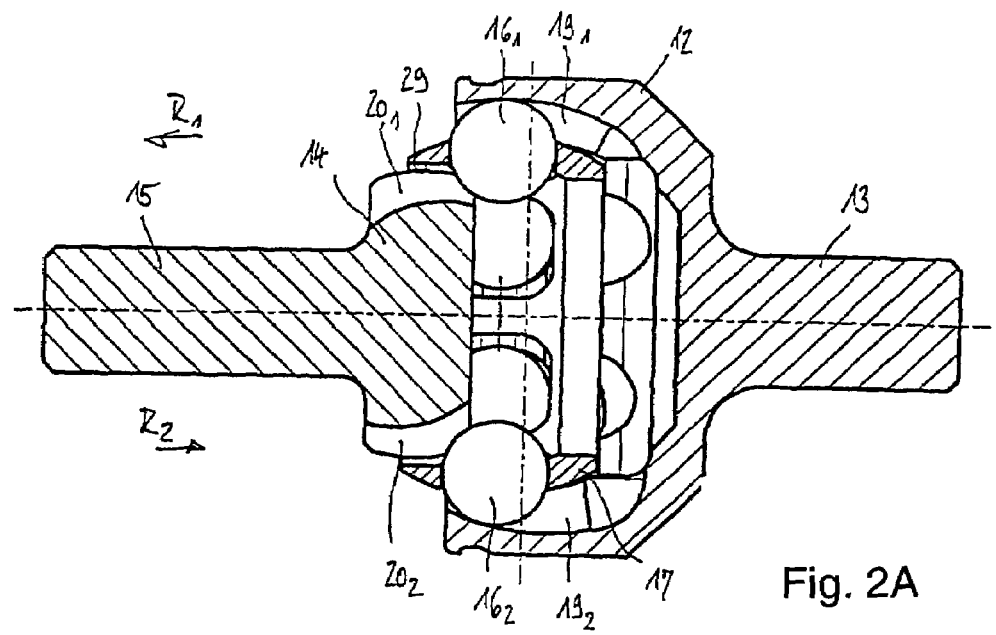
FIG. 2 shows an inventive fixed counter track joint with an outer joint part produced in one piece according to FIG. 1
 a) in a longitudinal section through a ball track plane
 b) in a longitudinal section through a plane between ball tracks
 during the axial mounting of the inner joint part.
Figure 2B:
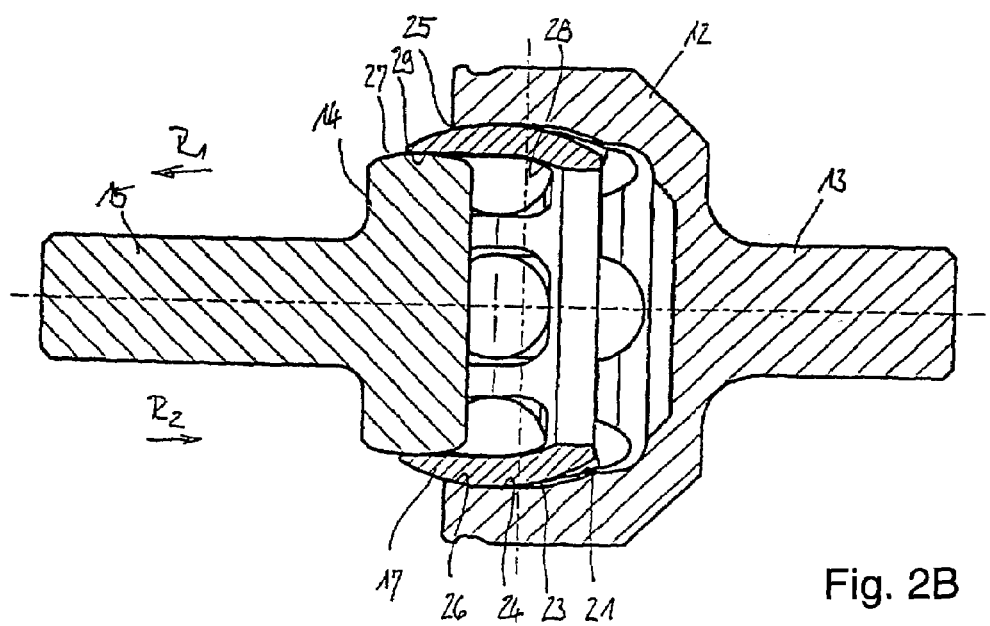
Figure 3A:
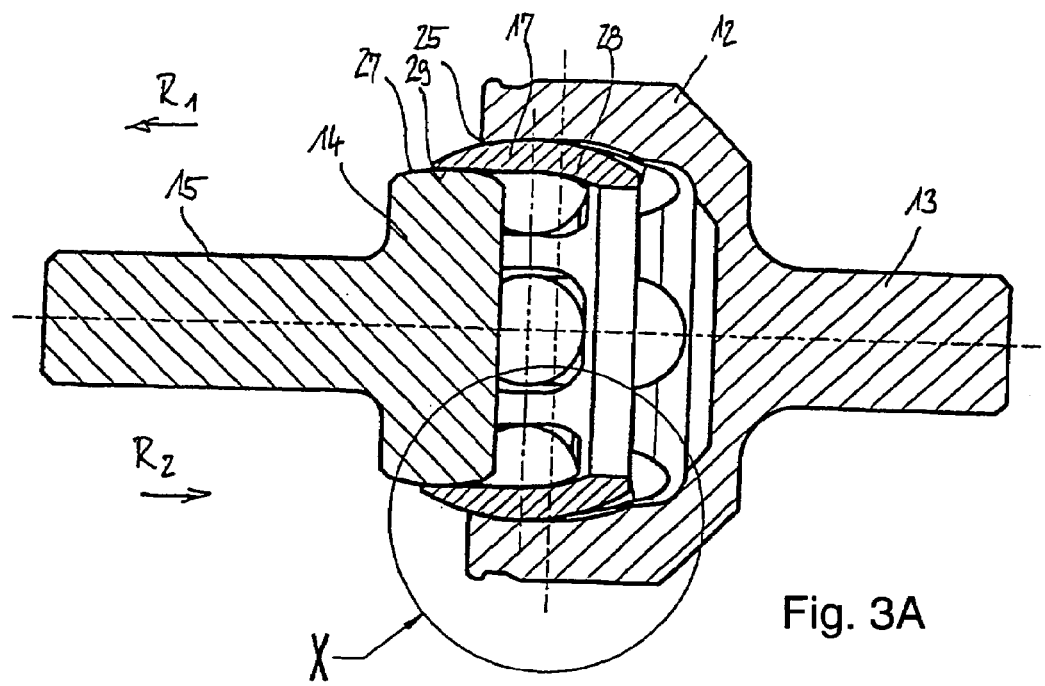
Figure 3B:
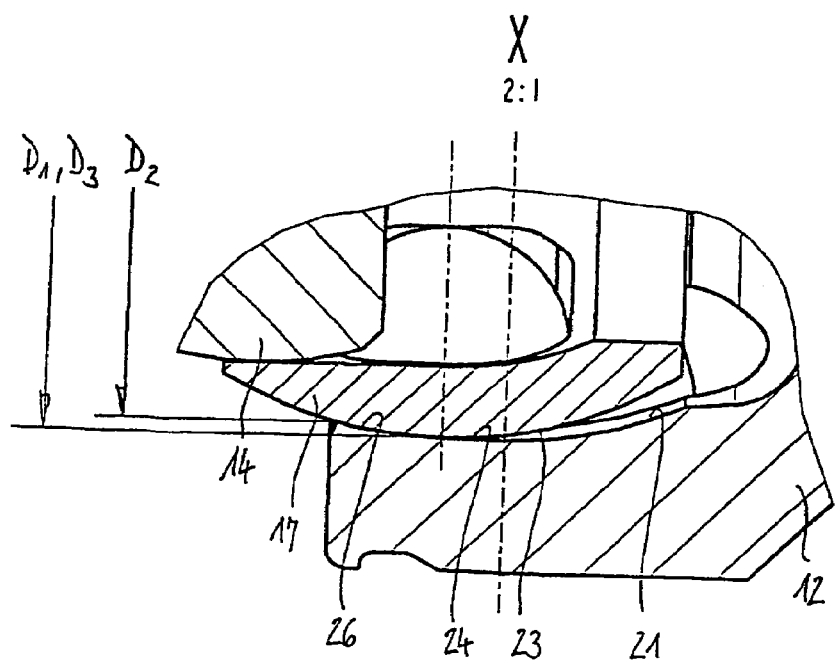

FIGS. 1 to 3 each show an inventive constant velocity fixed joint 11 comprising an outer joint part 12 with a formed-on journal 13, an inner joint part 14 with a formed-on journal 15, balls $16_1$, $16_2$, a ball cage 17 and a securing element 18. The joint is provided in the form of a counter track joint, i.e. first outer ball tracks $19_1$ in the outer joint part 12 and first inner ball tracks $20_1$ in the inner joint part 14 which hold first balls $16_1$ axially develop oppositely to that of second outer ball tracks $19_2$ in the outer joint part 12 and second inner ball tracks $20_2$ in the inner joint part 14 which hold second balls $16_2$. The first pairs of tracks $19_1$, $20_1$ have control angles which open in the first direction $R_1$ and the second pairs of tracks $19_2$, $20_2$ have control angles which open in the second direction $R_2$. The tracks are provided in the form of Rzeppa tracks, i.e. their track centre lines (not shown), like the identifiable track base lines, extend in the form of circular arches whose centres, with reference to the associated tracks $19_1$, $20_1$, $19_2$, $20_2$ are axially offset relative to one another. The counter track formation is obtained in that the centres of curvature of the outer tracks $19_1$, $19_2$ in the outer joint part are circumferentially alternately offset in opposite axial directions relative to the central joint plane and the centres of curvature of the inner ball tracks $20_1$, $20_2$ in the inner joint part 14 are circumferentially alternately offset in the opposite axial direction relative to the central joint plane. The central joint plane is defined by the centres of the balls. In the outer joint part 14 there is accommodated the ball cage 17 with a spherical outer face 23 whose greatest outer diameter has been given the reference symbol $D_1$. In the mounted position according to FIG. 1, the ball cage 17 is directly fixed in the second direction $R_2$ by the outer joint part which forms a first stop and guiding face 21 and in the first direction $R_1$ by an attached securing element 18 which forms a second stop and guiding face 22. As is particularly obvious in FIG. 2, the ball cage 17 is axially displaceable inside the outer joint part in an internally cylindrical displacement region 24 in the coaxial position relative to the outer joint part, which displacement region 24, towards the introducing aperture 25, is delimited by a recess 26 and towards the joint base 12 and the journal 13 respectively by the first stop and guiding face 21. As a result of the recess 26, the aperture diameter $D_2$ of the introducing aperture 25 is smaller than the above-mentioned greatest outer diameter $D_1$ of the ball cage. In the displacement region 24, the inner diameter $D_3$ of the outer joint part is greater than/equal to the greatest outer diameter $D_1$ of the ball cage. This configuration means that the ball cage, in a way known in itself, has to be threaded in direction $R_1$ into the outer joint part 14, i.e. the ball cage is rotated around a transverse axis by 90° and then rolled into the outer joint part while the webs between the outer tracks are introduced into the cage windows. Thereafter the cage is rotated back around said transverse axis by 90°, to get into the coaxial position relative to the outer joint part. Hereafter, the ball cage, as shown with reference to the inventive joint in FIGS. 2 and 3, is pulled within the displacement region 24 towards the introducing aperture 25. It is in this position that the balls are introduced; the first balls $16_1$ can be displaced outwardly in the outer tracks $19_1$ to such an extent that the inner joint part 14 can be introduced coaxially through an introducing aperture 29 in the ball cage 17 into same, with the first balls $16_1$ being able to enter, without being obstructed, the first tracks $20_1$. Thereafter, the ball cage 17, with its spherical outer face 23, is moved as far as the first stop and guiding face 21 and the inner joint part 14, with its spherical outer face 27, is moved as far as the undercut-free stop and guiding face 28 in the ball cage 17. In this position, the parts are then secured by the securing element 18 whose second stop and guiding face 22 now holds the ball cage 17 against the first stop and buiding face 21.

Now, FIGS. 4 and 5 will be described jointly below.

Figure 4A:
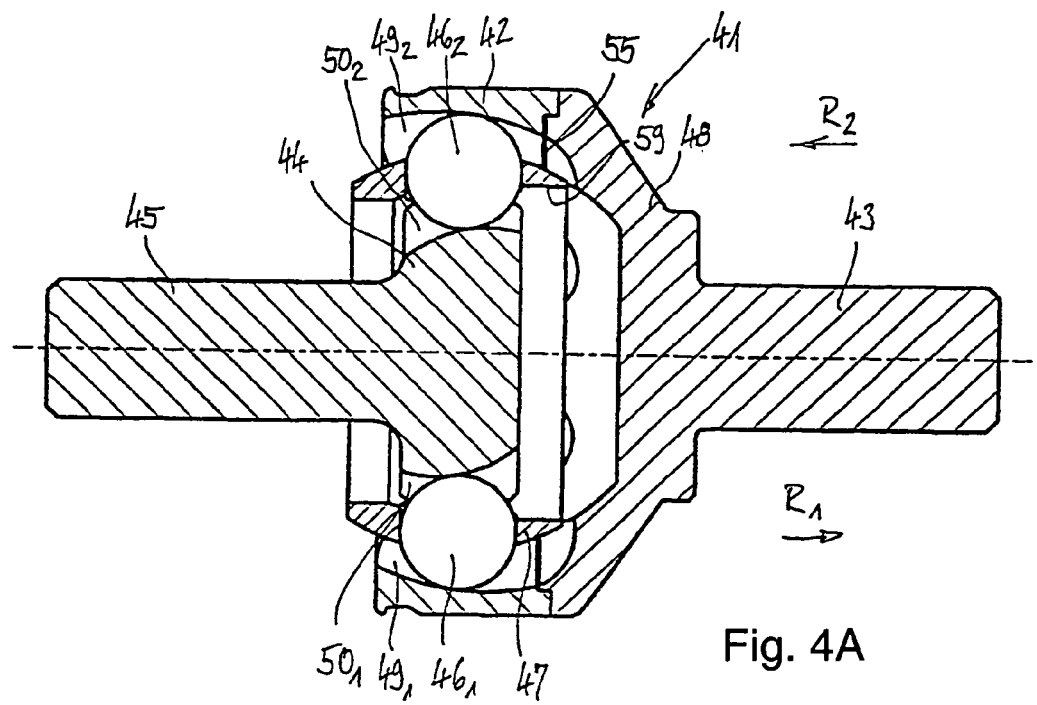
FIG. 4 shows an inventive fixed counter track joint in a second embodiment with a welded-on joint base
 a) in a longitudinal section through a ball track plane
 b) in a longitudinal section through a plane between ball tracks
 in a finish-assembled condition.
Figure 4B:
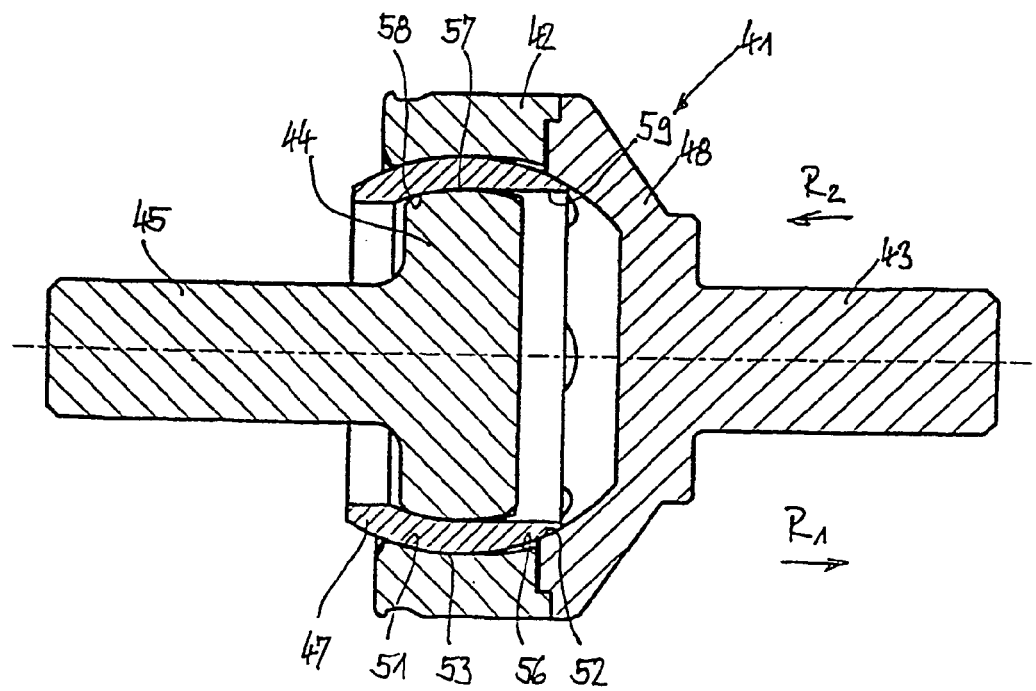
Figure 5A:
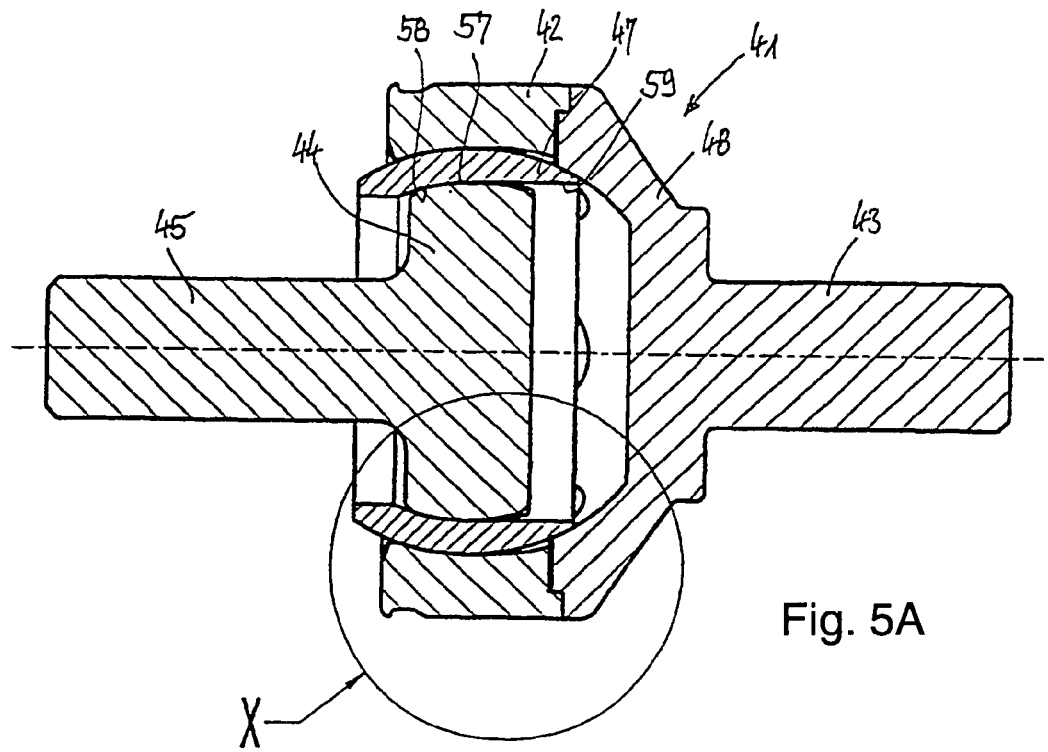
Figure 5B:
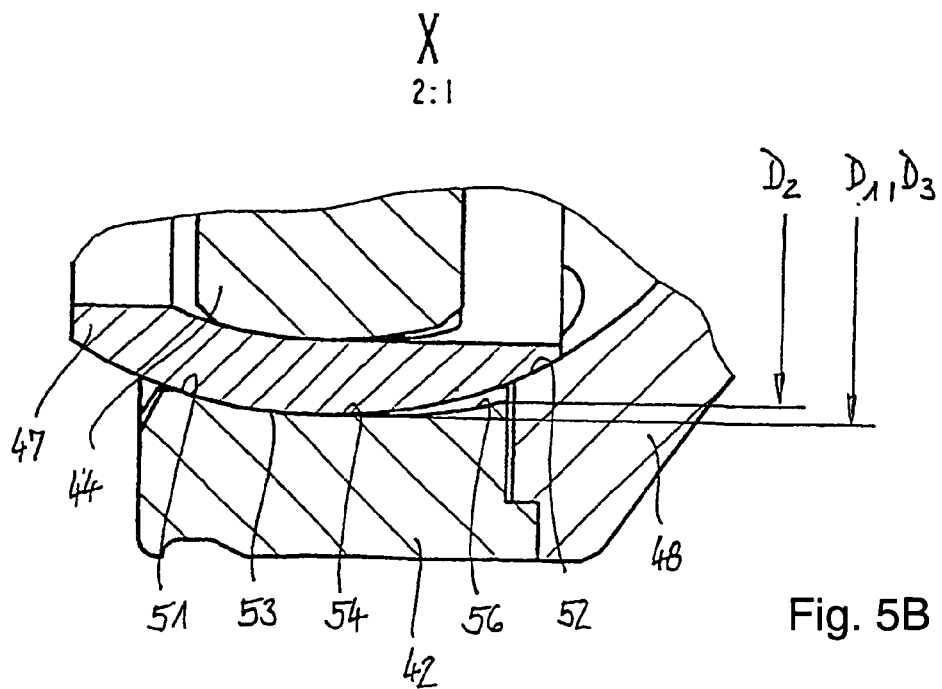

FIGS. 4 and 5 each show an inventive constant velocity fixed joint 41 comprising an outer joint part 42 with an attached base 48 and an adjoining journal 43, an inner joint part 44 with a formed-on journal 45, balls $46_1$, $46_2$, and a ball cage 47. The directions $R_1$, $R_2$ essential for assembly purposes have been exchanged relative to the joint of the previous embodiment. The base 48 forms the securing element. The joint is provided in the form of a counter track joint, i.e. first outer ball tracks $49_1$ in the outer joint part 42 and first inner ball tracks $50_1$ in the inner joint part 44 which hold the balls $46_1$ axially develop oppositely to that of second outer ball tracks $49_2$ in the outer joint part 42 and second inner ball tracks $50_2$ in the inner joint part 44 which hold second balls $46_2$. The tracks are provided in the form of Rzeppa tracks, i.e. their track centre lines (not shown), like the identifiable track base lines, extend in the form of circular arches whose centres, with reference to the associated tracks $49_1$, $20_1$, $49_2$, $20_2$ are axially offset relative to one another. The counter track formation is obtained in that the centres of curvature of the outer tracks $49_1$, $49_2$ in the outer joint part are circumferentially alternately offset in opposite axial directions relative to the central joint plane and the centres of curvature of the inner ball tracks $50_1$, $50_2$ in the inner joint part are circumferentially alternately offset in the opposite axial direction relative to the central joint plane. The central joint plane is defined by the centres of the balls. In the outer joint part 44 there is accommodated the ball cage 47 with a spherical outer face 53 whose greatest outer diameter has been given the reference symbol $D_1$. In the mounted position according to FIGS. 4, 5, the ball cage 47 is directly fixed in the second direction $R_2$ by the outer joint part which forms a first stop and guiding face 51 and in the first direction $R_1$ by the attached base 48 which forms a second stop and guiding face 52. As shown, the base 48 can either be welded on or threaded on. As is particularly obvious from the details in FIG. 5, the ball cage 47 is axially displaceable inside the outer joint part in an internally cylindrical displacement region 24 in a coaxial position relative to the outer joint part, which displacement region 54, in the first direction $R_1$, towards the introducing aperture 55 closed by the base 48, is delimited by a recess 56 and in the second direction $R_2$, towards the journal 45 by the first stop and guiding face 51. As a result of the recess 56, the aperture diameter $D_2$ of the introducing aperture 55 is smaller than the above-mentioned greatest outer diameter $D_1$ of the ball cage. In the displacement region 24, the inner diameter $D_3$ of the outer joint part is greater than/equal to the greatest outer diameter $D_1$ of the ball cage. This configuration means that the ball cage, with the base 48 having been removed, has to be threaded in direction $R_1$ into the outer joint part 44, i.e. the ball cage is rotated around a transverse axis by 90° and then rolled into the outer joint part, while the webs are introduced between the outer tracks into the cage windows. Hereafter, the ball cage is rotated back by 90° around said transverse axis in order to reach the coaxial position relative to the outer joint part. Thereafter, the ball cage of the inventive joint according to FIG. 2 is pulled within the displacement region 54 towards the introducing aperture 55. It is in this position that the balls are introduced; the first balls $46_1$ can be displaced outwardly in the outer tracks $49_1$ to such an extent that the inner joint part 44 can be introduced coaxially through an introducing aperture 59 in the ball cage 47 into same, with the first balls $46_1$ being able, without being obstructed, to enter the first tracks $50_1$. Thereafter, the ball cage 47, with its spherical outer face 53, is moved as far as the first stop and guiding face 51 and the inner joint part 44, with its spherical outer face 57, is moved as far as the undercut-free stop and guiding face 58 in the ball cage 47. In this position, the parts are then secured by mounting the base 48 whose second stop and guiding face 52 now holds the ball cage 47 against the first stop and guiding face 51.

LIST OF REFERENCE NUMBERS 11, 41 joint
12, 42 outer joint part
13, 43 journal
14, 44 inner joint part
15, 45 journal
16, 46 ball
17, 47 ball cage
18 securing element
48 base
19, 49 outer track
20, 50 inner track
21, 51 guiding face 1
22, 52 guiding face 2
23, 53 outer face of cage
24, 54 displacement region
25, 55 introducing aperture
26, 56 recess
27, 57 outer face of inner joint part
28, 58 stop and guiding face
29, 59 introducing aperture (17, 47)

The invention claimed is:

1. A constant velocity fixed ball joint in the form of a counter track joint, comprising:
    an outer joint part with outer tracks, an inner joint part with inner tracks, torque transmitting balls which are received in pairs of tracks consisting of outer tracks and inner tracks, and a ball cage with cage windows in which the balls are held in a common plane and are guided on to the angle-bisecting plane when the joint is articulated;
    first outer tracks, together with first inner tracks, forming first pairs of tracks whose control angles open in a first axial direction ($R_1$);
    second outer tracks, together with second inner tracks, forming second pairs of tracks whose control angles open in a second axial direction ($R_2$);
    wherein the control angles are defined as angles between the tangents at the ball contact points in the tracks when the joint is in the aligned condition;
    the ball cage including a spherical outer face with a greatest diameter $D_1$;
    the outer joint part forming an introducing aperture for the ball cage with an aperture diameter $D_2 < D_1$ measured between the outer tracks;
    the ball cage, in engaging the outer tracks, can be threaded into the outer joint part in the second axial direction ($R_2$);
    the outer joint part forming a first stop and guiding face for a spherical outer face of the ball cage;
    wherein, between the introducing aperture and the first stop and guiding face, the outer joint part comprises a displacement region for the ball cage with an internal diameter of $D_3 > D_1$; and
    a securing element attached at the outer joint part in front of the introducing aperture forming a second stop and guiding face for the spherical outer face of the ball cage.

2. A joint according to claim 1, wherein the ball cage comprises an introducing aperture for the inner joint part through which the inner joint part can be introduced in the second axial direction ($R_2$) in a coaxial position relative to the ball cage.

3. A joint according to claim 1, wherein the ball cage, on its inside, forms a stop and guiding face for a spherical outer face of the inner joint part.

4. A joint according to claim 1, wherein the inner joint part is integral with a joint journal.

5. A joint according to claim 1, wherein the securing element is provided in the form of an annular element attached at the joint aperture of the outer joint part and wherein said second axial direction ($R_2$) points from the joint aperture to the central joint plane.

6. A joint according to claim 1, wherein the securing element comprises individual wedge elements attached to or formed on at the joint aperture of the outer joint part and wherein said second axial direction ($R_2$) points from the joint aperture to the central joint plane.

7. A joint according to claim 1, wherein the securing element is the joint base formed separately from the outer joint part and wherein said second axial direction ($R_2$) points from the joint base to the central joint plane.

8. A joint according to claim 1, wherein the securing element is formed by an additional annular or cover element inserted between the outer joint part and the joint base and wherein said second axial direction ($R_2$) points from the joint base to the central joint plane.

9. A method of assembling a constant velocity fixed ball joint according to claim 1 comprising the steps of:
- introducing the ball cage, in engaging the outer tracks of the outer joint part, into the outer joint part through the introducing aperture for the ball cage;
- arranging the cage windows to correspond to the outer tracks and inserting the balls from the inside of the ball cage into the cage windows and into the outer tracks;
- with the outer joint part and the ball cage being coaxially aligned, displacing the ball cage and balls within the displacement region towards the introducing aperture for the ball cage;
- introducing the inner joint part, while being co-axially aligned relative to the outer joint part and to the ball cage, through the introducing aperture for the inner joint part into the ball cage;
- axially displacing the ball cage, balls and inner joint part together until the ball cage stops against the first stop and guiding face; and
- while the second stop and guiding face stops against the ball cage, attaching the securing element at the outer joint part,
- wherein the balls are inserted from the inside of the ball cage into the cage windows and into the outer tracks.

10. A joint according to claim 2, wherein the inner face of the ball cage is undercut-free when viewed in said second axial direction ($R_2$).

11. A joint according to claim 2, wherein the ball cage, on its inside, forms a stop and guiding face for a spherical outer face of the inner joint part.

12. A joint according to claim 2, wherein the inner joint part is integral with a joint journal.

13. A joint according to claim 2, wherein the securing element is provided in the form of an annular element attached at the joint aperture of the outer joint part and wherein said second axial direction ($R_2$) points from the joint aperture to the central joint plane.

14. A joint according to claim 2, wherein the securing element is the joint base formed separately from the outer joint part and wherein said second axial direction ($R_2$) points from the joint base to the central joint plane.

15. A joint according to claim 10, wherein the ball cage, on its inside, forms a stop and guiding face for a spherical outer face of the inner joint part.

16. A joint according to claim 10, wherein the inner joint part is integral with a joint journal.

17. A joint according to claim 10, wherein the securing element is provided in the form of an annular element attached at the joint aperture of the outer joint part and wherein said second axial direction ($R_2$) points from the joint aperture to the central joint plane.

18. A joint according to claim 10, wherein the securing element is the joint base formed separately from the outer joint part and wherein said second axial direction ($R_2$) points from the joint base to the central joint plane.

19. A joint according to claim 3, wherein the inner joint part is integral with a joint journal.

20. A joint according to claim 3, wherein the securing element is provided in the form of an annular element attached at the joint aperture of the outer joint part and wherein said second axial direction ($R_2$) points from the joint aperture to the central joint plane.

21. A joint according to claim 3, wherein the securing element is the joint base formed separately from the outer joint part and wherein said second axial direction ($R_2$) points from the joint base to the central joint plane.

22. A joint according to claim 4, wherein the securing element is provided in the form of an annular element attached at the joint aperture of the outer joint part and wherein said second axial direction ($R_2$) points from the joint aperture to the central joint plane.

23. A joint according to claim 4, wherein the securing element is the joint base formed separately from the outer joint part and wherein said second axial direction ($R_2$) points from the joint base to the central joint plane.

* * * * *